May 14, 1963  H. J. NEARHOOF ET AL  3,089,383
REFLECTANCE MEASURING EQUIPMENT
Filed Nov. 4, 1959  3 Sheets-Sheet 1
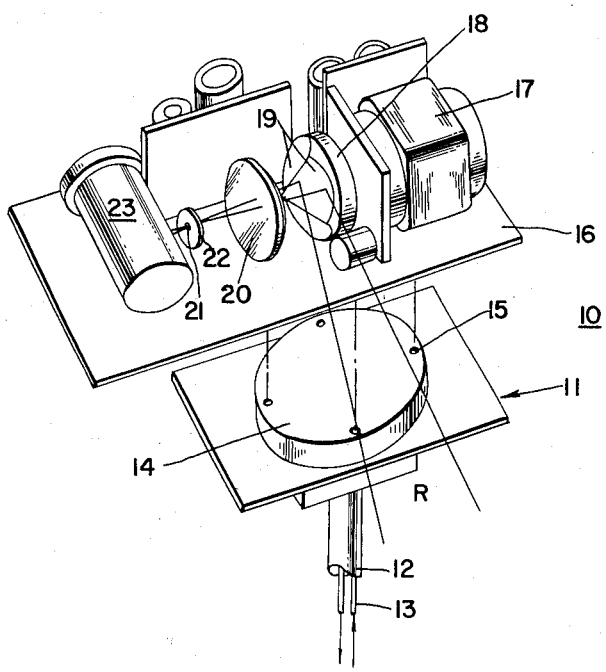
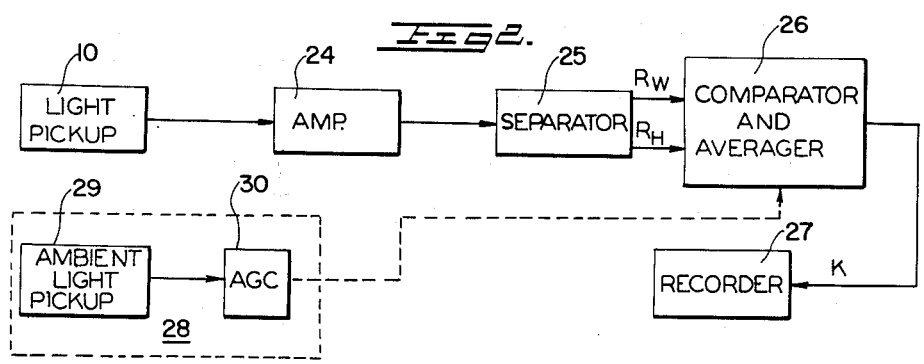
INVENTORS
HAROLD J. NEARHOOF
CASPAR L. WOODBRIDGE
DAVID E. HARRIS
BY *Harmon, Pierce & Kurz*
ATTORNEY May 14, 1963  H. J. NEARHOOF ET AL  3,089,383
REFLECTANCE MEASURING EQUIPMENT
Filed Nov. 4, 1959  3 Sheets-Sheet 2
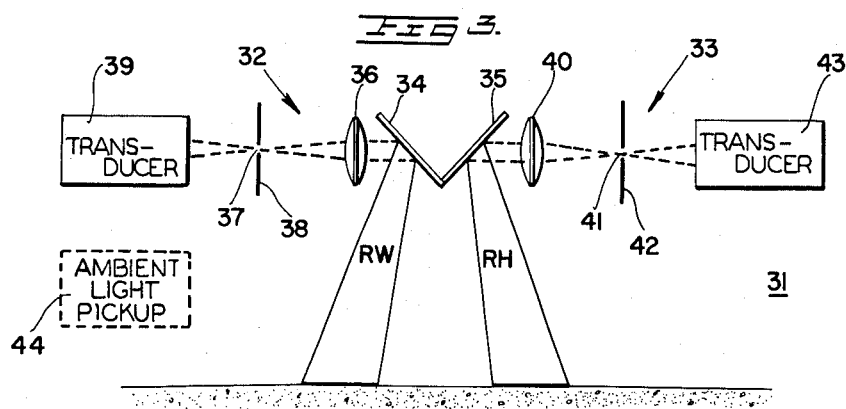
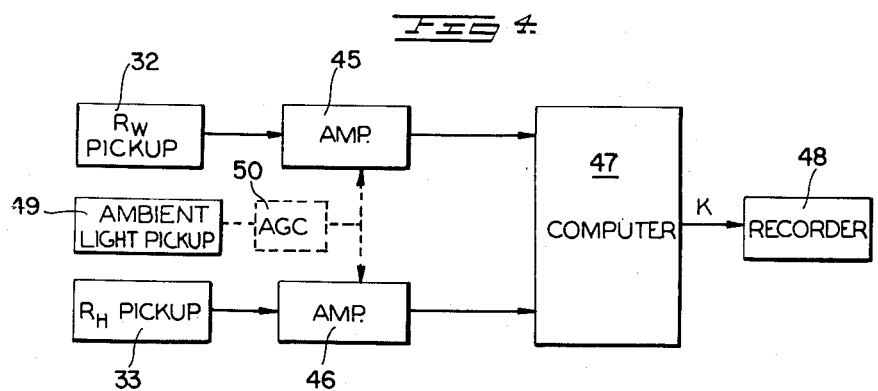
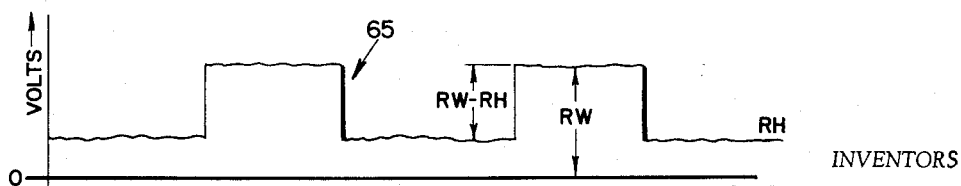
INVENTORS
HAROLD J. NEARHOOF
CASPAR L. WOODBRIDGE
DAVID E. HARRIS
BY Harmon, Pierce & Kurz
ATTORNEY United States Patent Office 3,089,383
Patented May 14, 1963

3,089,383
REFLECTANCE MEASURING EQUIPMENT
Harold J. Nearhoof and Caspar L. Woodbridge, State College, and David E. Harris, Boalsburg, Pa., assignors to HRB-Singer, Incorporated, State College, Pa., a corporation of Delaware
Filed Nov. 4, 1959, Ser. No. 850,952
6 Claims. (Cl. 88—14)

This invention relates to reflectance measuring equipment generally, and more particularly to electro-optical measuring equipment for determining the quality of painted lines of great length.

The problem of determining whether or not the painted white line used to separate adjacent lanes on a highway, needs repainting has been the concern of highway departments and paint suppliers for some time. Often a question arises as to the acceptability of a recently completed paint job, for many highway departments require specified standards and a guaranteed minimum life for their highway markings.

At present the decision regarding the acceptability of newly painted highway markings or the need to repaint old markings is usually based upon a visual inspection of the painted lines, as no practical standards or measuring equipment for determining the quality of painted markings have been thus far developed.

The primary object of this invention is to provide a simple and economical electro-optical measuring instrument for determining the quality of a painted surface by measuring and recording the intensity of the light reflected therefrom.

A second object of this invention is to provide an electro-optical measuring instrument for determining the quality of painted highway markings which is capable of providing an indication when used with any of the standard widths and arrangements of painted markings.

Another object of this invention is to provide an electro-optical measuring instrument for determining the quality of a painted highway line, which is capable of being mounted upon a vehicle so as to provide operation at reasonable speeds, and which includes a recording mechanism which is driven at a speed proportional to that of the vehicle, so that one axis of the recording will represent the distance travelled.

A further object of this invention is to provide an electro-optical measuring instrument for determining the quality of a painted highway line which is capable of being mounted on a vehicle so as to determine the reflectance of the painted surface in the visible portion of the spectrum at an oblique angle as normally viewed by the driver of a motor vehicle.

Another object of this invention is to provide an electro-optical measuring instrument for determining and recording the reflected light intensity of a painted highway line which minimizes the effects of ambient light upon the accuracy of the recorded measurement.

A further object of this invention is to provide an electro-optical measuring instrument for determining and recording the reflected light intensity of a painted highway line in which the amplitude of the signal to be recorded is controlled by the intensity of the incident light present in the vicinity of the painted surface.

Another object of this invention is to provide an electro-optical measuring instrument for recording the reflected light intensity of a painted highway line in which corrective allowance is made for light reflected from surfaces adjacent to the painted surface.

A further object of this invention is to provide a method for determining the quality of a painted surface by measuring and recording the intensity of light reflected from the surface.

Another object of this invention is to provide a method for determining the quality of a painted surface by measuring the difference between the intensity of the light reflected from the painted surface and the intensity of that reflected from adjacent surfaces.

A further object of this invention is to provide a method for determining the quality of a painted highway surface by measuring the intensity of the light reflected from the painted surface at the oblique angle at which the driver of a vehicle normally views the highway.

A still further object of this invention is to provide a method for determining the quality of a painted surface by measuring the contrast between the intensity of light reflected from the painted surface and the intensity of that reflected from adjacent surfaces.

With the foregoing and other objects in view, the invention resides in the following specification and appended claims, certain embodiments and details of construction of which are illustrated in the accompanying drawings in which:

FIGURE 1 is an exploded view of the optical light pickup utilized by this invention;

FIGURE 2 is a block diagram of the circuit of the invention utilizing the optical light pickup of FIGURE 1;

FIGURE 3 is an elevation view of a light pickup utilized by this invention in which some components are shown in block form;

FIGURE 4 is a block diagram of the circuit of the invention utilizing the optical system of FIGURE 3;

FIGURE 8 illustrates the voltage waveform produced by the light pickup of FIGURE 1.

Figure 5:
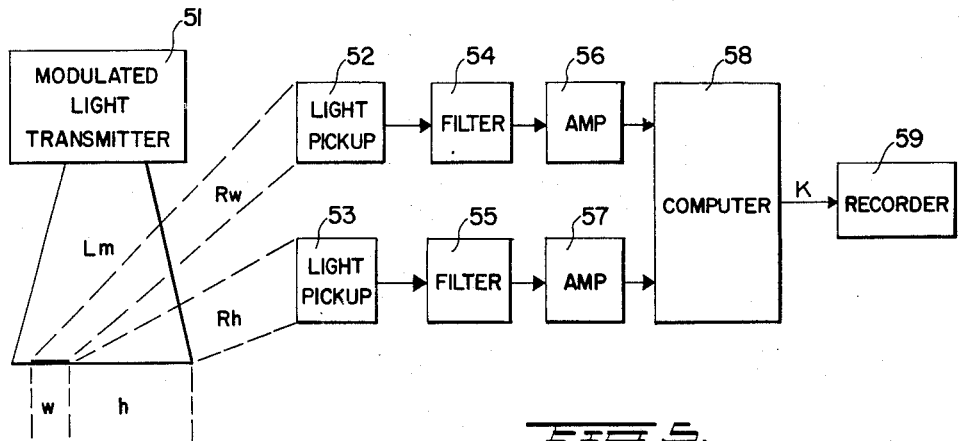
FIGURE 5 is a block diagram illustrating a modified form of the circuit of FIGURE 4 showing the use of an auxiliary light source.

Referring to FIGURE 1, a pickup device, indicated generally at 10, may be utilized as the receiving means for light rays which are reflected from a painted surface. The pickup device 10 comprises a mounting member 11 which has secured to one side thereof a hollow mast 12 through which extends a power cable 13. On the side of the mounting member opposite to mast 12, there is attached a turntable 14 through which extend mounting apertures 15. These mounting apertures are aligned with mounting means (not shown) provided on the underside of an instrument base plate 16, so that the base plate can be removably secured to the turntable. Mounted upon base plate 16 is an electric motor 17 which drives a rotating scanner member 18. Scanner member 18 is provided with a number of light reflection surfaces 19, and may have a polyhedral configuration as shown in the drawing. The rotation of the scanner member 18 causes the reflection surfaces to scan a wide area, thus providing for a reasonable tolerance of vehicle movement when the light receiver is mounted upon a vehicle. Light rays R, which are reflected from the surface scanned, contain reflected light from both the painted surface to be measured and from surrounding surfaces. These light rays are deflected by the rotating reflection surfaces 19 to a lens 20. Lens 20 causes the light rays to converge so as to pass through a pinhole 21 in a screen member 22 and fall upon a light sensitive transducing means 23. Transducing means 23 can be a photocell or any suitable light sensitive device capable of transforming light energy into electrical energy.

Also mounted upon base plate 16 are additional electronic components which are incidental to the operation of the scanning device.

FIGURE 2 shows a block diagram of the circuit of the invention in which the light pickup device 10 of FIGURE 1 receives the reflected light from a painted surface and adjacent surfaces. The light from the painted surface, designated $Rw$, and the light from the adjacent surfaces, designated $Rh$, is transformed by the pickup device 10 into electrical energy having an amplitude which is proportional to the intensities of $Rw$ and $Rh$.

The amplitude of the electrical energy produced by the light pickup device is sometimes proportional to the individual intensity of $Rh$ or $Rw$, and sometimes it is proportional to the combination of the intensities of $Rh$ and $Rw$. This is illustrated by waveform 65 of FIGURE 8 where a relatively constant voltage representative of the intensity of $Rh$ is broken by periodic voltage peaks representative of $Rw$ or the combination of $Rw$ and $Rh$. These variations are caused by the rotating scanner member of the light pickup device (FIGURE 1) which, during its cycle of rotation, is sometimes positioned so as to receive reflected light from only the surfaces surrounding the painted surface, while during one portion of its rotational cycle it receives light of a higher intensity from the painted surface to be measured.

Figure 6:
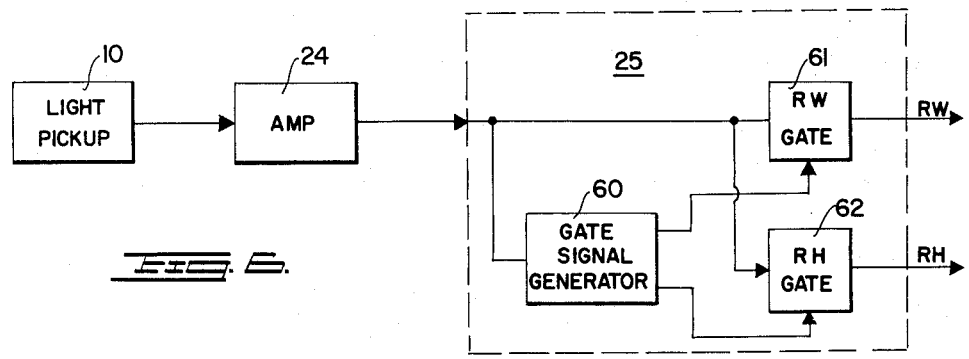
FIGURE 6 is a block diagram of the circuit elements comprising the separator unit shown in block form by FIGURE 2.

The electrical energy from the pickup device is passed to an amplifier stage 24, and then the amplified energy is fed to a separator unit 25 where it is divided into two signals which are proportional to the individual intensities of $Rh$ and $Rw$. The separator unit 25 (FIG. 6) includes a gate signal generator 60 which generates a time gate signal synchronized with the signal received from the painted surface. The gate signal may be derived from a Schmitt trigger circuit or some other suitable circuit for generating timed pulses, and the output pulses from this circuit control the operation of the $Rw$ gate 61 and the $Rh$ gate 62. The $Rw$ gate is triggered by a pulse from the gate signal generator when the reflected light beam $Rw$ is being received from the painted surface so that an electrical signal, which is a function of $Rw$, is allowed to pass through gate 61 while gate 62 is closed. When a reflected light signal $Rh$ is received from surfaces surrounding the painted surface, the $Rh$ gate 62 passes an electrical signal representative of $Rh$ while gate 61 is closed. A low-pass filter (not shown) may be included in the input circuit of the gate signal generator 60 to prevent short noise pulses from affecting the operation of the separator unit.

The output from the separator 25 is fed to a comparator and averager 26 which provides an output that is a function of the relationship between $Rh$ and $Rw$. This output, designated K, is then fed to a recorder 27 where it controls the indication transcribed upon a recording medium.

In cases where the reflection of natural light from a painted surface is used to obtain a measurement, it is often necessary to include an ambient light monitor 28 in the system. This monitor compensates for changes in the intensity of the reflected light beams caused by variations in the intensity of the ambient light in the area under measurement. Light monitor 28 includes a light pickup device 29 and an automatic gain control system 30. The light pickup 29 may utilize any of the presently known conversion devices to produce an electrical signal which is a function of the degree of ambient illumination in the vicinity of the pickup device. This electrical signal is fed to the automatic gain control system which in turn controls the gain of the comparator and averager 26. When the ambient light in the area under measurement increases, $Rh$ and $Rw$ will increase by an equal amount, as will the electrical signals delivered to the comparator and averager. This change in ambient illumination causes monitor 28 to vary the gain of the comparator and averager to compensate for the increase in ambient light, and the electrical signals representing $Rh$ and $Rw$ remain constant within the comparator and averager under conditions of varying ambient illumination.

FIGURE 3 shows an alternate light receiving device which may be used with the invention in which two light pickup systems 32 and 33 are combined into a single light receiver indicated generally at 31. This receiver comprises two fixed light reflecting members 34 and 35 which are used to perform a scanning function. One of these light reflecting members is positioned so as to receive light rays $Rw$ which are reflected from the painted surface to be measured, while the second light reflecting member is set so that it will receive light rays $Rh$ reflected from the surfaces in the immediate vicinity of the painted surface to be measured. The light reflecting members 34 and 35 are set to scan a surface area of a size sufficient to provide for a reasonable tolerance of vehicle movement when the light receiver is mounted upon a vehicle. The reflected light rays $Rw$ are received by the reflecting member 34 which deflects the rays and directs them through a lens 36. Lens 36 causes the light rays to converge to pass through a pinhole 37 in a screen member 38 and fall upon a light sensitive transducing means 39 which converts the light energy into an electrical signal of an amplitude proportional to the light intensity. In a similar manner light rays $Rh$ are passed by means of reflecting member 35, a lens 40 and a pinhole 41 in a screen 42 to a light sensitive transducing means 43. It may be found necessary to insert an ambient light receiver, indicated at 44, into the system. This receiver would sense the general light intensity in the area scanned by the light reflecting members 34 and 35.

FIGURE 4 shows a block diagram of the circuit used with the light receiver of FIGURE 3. The electrical signals from the $Rw$ pickup 32 and the $Rh$ pickup 33 of the light receiver shown in FIGURE 3 are fed to amplifiers 45 and 46. The amplified signals from amplifiers 45 and 46 are then fed to a computer 47 where they are compared. The computer will provide an output signal which is a function of the relationship between $Rh$ and $Rw$. This output signal, designated K, is then fed to a recorder 48, where it controls the indication transcribed upon a recording medium. Recorder 48 may be a strip recorder, or any suitable recorder or indicator which may be controlled by an incoming electrical signal. As with the recorder 27 of FIGURE 2, if the light measuring system is mounted upon a vehicle, recorder 48 will be driven at a speed proportional to that of the vehicle so that one axis of the recording will indicate the distance travelled.

In many cases it might be necessary to include an ambient light pickup 49 in the system. This pickup furnishes a controlling signal to an automatic gain control section 50 which in turn controls the power output of amplifiers 45 and 46. The automatic gain control 50 varies the output of the amplifiers, and thus the electrical signals representing $Rh$ and $Rw$, in proportion to variations of the ambient light intensity in the vicinity of the surface to be measured.

FIGURE 5 discloses a modified light receiving system which may be used to eliminate the ambient light receivers shown in FIGURES 2 and 4. This system includes a modulated light transmitter 51 which directs a beam of modulated light on to the surface to be measured. The light transmitter may be used in conjunction with either of the light receiving systems shown by FIGURES 2 and 4, and it may be mounted in a position separate from the receiving system or it may be included as a component in one of the light pickup devices previously shown. When carried by a vehicle for measurement of a painted highway line, the light transmitter and receiving systems are mounted so that reflected light rays will be received at the oblique angle at which a vehicle driver normally views the highway. FIGURE 5 shows the use of the modulated light transmitter in conjunction with the invention as shown by FIGURE 4, in which a modulated light beam $Lm$ is directed on to a painted surface $w$ which is to be measured and also on to the adjacent surfaces $h$. Reflected light rays $Rw$ and $Rh$ are projected from surfaces $w$ and $h$ and are received by light pickups 52 and 53. Light pickups 52 and 53, operating in the manner described in connection with FIGURE 3, convert the modulated light energy into modulated electrical energy which is then passed through filters 54 and 55. These filters are tuned to the frequency at which the light energy is modulated by transmitter 51 and they block the electrical signals caused by the pickup of the ambient light present in the area scanned by the light pickups 52 and 53. The electrical signals representing the intensity of $Rw$ and $Rh$ are then amplified by amplifiers 56 and 57 and passed to the computer 58, where they are compared. A signal K, equal to a function of the relationship between $Rw$ and $Rh$ is then passed to a recording device 59. By using a modulated light transmitter in the system and filtering out the effects of ambient light, the need for an ambient light pickup and automatic gain control system is eliminated.

As an alternate form of the invention shown by FIGURE 5, the light transmitter 51 might comprise a source of ultraviolet or other specialized light energy. In this case the electrical filters 54 and 55 would be replaced by optical filters positioned within the light pickups 52 and 53 so that only the special light rays from the transmitter which are reflected by the painted surface would be allowed to pass through the filters.

Figure 7:
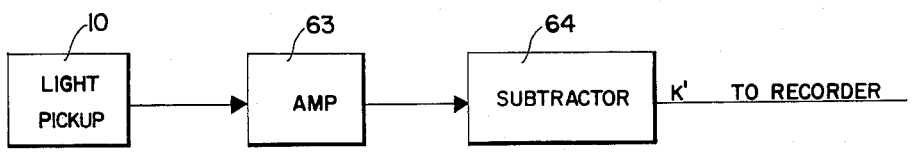
FIGURE 7 is a block diagram of an alternate circuit of the invention utilizing the light pickup of FIGURE 1.

FIGURE 7 shows a block diagram of the circuitry of another embodiment of the invention wherein the output signal produced is representative of the difference between $Rw$ and $Rh$. In this circuit light pickup device 10 of FIGURE 1 receives the combined reflected light beams $Rw$ and $Rh$ and converts them into electrical energy which is fed to an amplifier 63. The amplified signal from the amplifier is then passed to a subtractor 64 which produces an output signal proportional to the difference between $Rw$ and $Rh$. This difference signal, designated $K'$, may then be directed to a recording unit where it controls the indication transcribed upon a suitable recording medium.

The subtractor 64 may utilize several known electrical components to obtain the output $K'$ which is a function of $Rw-Rh$. An A.C. filter unit utilized as the subtractor 64 would remove the D.C. component from the waveform 65 of FIGURE 8 leaving only the peak portions of the waveform which represent $Rw-Rh$.

An alternate method of deriving $Rw-Rh$ is to utilize a suitable clamping circuit for subtractor 64 so that the waveform 65 of FIGURE 8 is clamped to a reference voltage in accordance with the average amplitude of the portion of the waveform representing $Rh$. The peak value of the output signal then represents $Rw-Rh$.

In using the apparatus of this invention to determine the quality of a painted surface, such as a highway line, it is necessary to determine the proper angle for light reception and to select a criterion for measurement. When the invention is carried by a vehicle for the measurement of painted highway lines, it is important that the light receiver be mounted so that the intensity of the reflected light rays may be determined at an oblique angle as normally viewed by the driver of a vehicle. If the reflection coefficient of the painted line is selected as the criterion for measurement and a modulated light transmitter similar to the one shown in FIGURE 5, or some other auxiliary light source, is used with the reflected light pickup equipment, the effects of ambient light in the area to be measured are eliminated. This makes it unnecessary to provide for ambient light in the formula used to determine the reflection coefficient of the painted line.

In this situation the reflection coefficient of the painted line can be found by the following formula where:

$Rw$ = the light reflected from the painted line;
$Rh$ = the light reflected from surfaces surrounding the painted line; and
$K$ = the criterion of measurement.

The basic formula, which includes no reflected light other than that from the painted surface in question, consists of:

$$Rw = K$$

It is often impractical to scan only the painted surface in question, so it becomes necessary to consider the light reflected from surfaces surrounding the one to be measured. If the criterion for measurement is equal to the difference between $Rw$ and $Rh$, the formula would be:

$$Rw - Rh = K$$

If no auxiliary light transmitter is incorporated with the light receiving system used for the measurement, it is necessary to consider the ambient light present in the area under measurement, for ambient light will affect both $Rw$ and $Rh$, and consequently K will be affected. As the ambient light within an area increases, the $Rw$ and $Rh$ will increase by a proportionate amount, as will K. In the basic formula where:

$I$ = ambient light $$\frac{Rw}{I} = K$$

In the difference formula, if the I increases by 10%, $Rw$ and $Rh$ will increase by 10% as will K.

$$1.1Rw - 1.1Rh = 1.1K$$

If ambient light monitors are used in the measuring system as shown by FIGURES 2 and 4, the difference between $Rw$ and $Rh$ can be kept constant under conditions of varying illumination and:

$$\frac{Rw}{I} - \frac{Rh}{I} = K$$

or $$\frac{1.1Rw}{1.1I} - \frac{1.1Rh}{1.1I} = K$$

In an alternate system of measurement, the criterion of measurement could be the contrast between the reflections of $Rw$ and $Rh$. Using this method, no ambient light information would be necessary as:

$$\frac{Rw/I}{Rh/I} = \frac{Rw}{Rh} = K$$

It will be readily apparent to those skilled in the art that the present invention provides a simple and effective apparatus and method for determining the quality of a painted surface by measuring the intensity of light reflected therefrom. This invention may be subject to numerous modifications well within the purview of the inventor, who only intends to be limited to a liberal interpretation of the specification and the appended claims.

We claim:

1. An electro-optical measuring instrument for determining the quality of a painted surface by measuring and recording the light reflected from said painted surface comprising a light pickup device for receiving and converting the combined reflected light energy from a painted surface and adjacent surfaces into electrical energy, an ambient light monitor for converting ambient light energy into electrical energy, an automatic gain control unit electrically connected to said ambient light monitor, and an electrical energy translating unit including an amplifier, a separator, and a comparator and averager, and a recording device connected to said light pickup device, said automatic gain control unit providing an output signal to control the gain of the comparator and averager in accordance with an electrical signal received from the ambient light monitor.

2. A method for determining the quality of a painted surface in the presence of ambient light which includes receiving the light energy reflected from said painted surface and that reflected from surfaces adjacent to said painted surface, receiving directly the ambient light energy present in the area of said painted surface, converting said light energies into proportionate electrical energies, removing the electrical energy proportionate to the ambient light from that proportionate to the reflected light, comparing said proportionate reflected light energies to produce a signal which is a function of the relationship between said energies, and recording said difference signal.

3. A method for determining the quality of a painted surface which includes receiving the light energy reflected from said painted surface combined with that reflected from surfaces adjacent to said painted surface, converting said combined light energy into an electrical energy proportional to the intensity of said combined light energy, separating the electrical energy proportionate to the light reflected from said painted surface from the electrical energy proportionate to the light reflected from said adjacent surfaces, combining said separated electrical energies to obtain a single signal which is a difference function of the relationship between said separated electrical energies, and recording said single signal as a measure of the quality of said painted surface.

4. An electro-optical measuring instrument for determining the quality of a painted surface by measuring and recording the light reflected from said painted surface, comprising a light pickup means for receiving the reflected light energy from a painted surface and from surfaces adjacent to said painted surface and converting said light energy into proportionate electrical signals, said light pickup means including optical light reflecting means to receive and deflect said light energy, optical means for receiving and causing the convergence of the deflected light energy from said reflecting means, and light sensitive transducing means to convert the light from said optical means into proportionate electrical energy, an ambient light monitor for converting ambient light energy into electrical energy, an automatic gain control unit electrically connected to said ambient light monitor, an electrical energy translating system connected to said light pickup means and to said automatic gain control unit and a recording means electrically connected to said electrical energy translating system, said electrical energy translating system including combining means wherein the electrical signals representative of the reflected light energy from said painted surface are compared with the electrical signals representative of the reflected light energy from said surfaces adjacent to said painted surface to obtain an output signal which is a function of the relationship between said representative signals, the gain of said combining means being controlled by the signal from said automatic gain control unit.

5. An electro-optical measuring instrument for determining the quality of a painted surface by measuring and recording the light reflected from said painted surface, comprising a light pickup device for receiving and converting the combined reflected light energy from a painted surface and adjacent surfaces into electrical energy, said light pickup device including a rotating optical scanner member having a plurality of light reflecting surfaces which receive and deflect the combined reflected light from a painted surface and adjacent surfaces, an electrical energy translating system connected to said light pickup device, and a recording device connected to said electrical energy translating system, said electrical energy translating system including an amplifier, a separator connected to said amplifier, said separator including a gate signal generator for producing a timed gate signal synchronized with the signal received from said painted surface, and first and second gate circuits electrically connected to said amplifier and to said gate signal generator, said first and second gate circuits being sequentially operated by said gate signal generator whereby the combined electrical energy from said amplifier is divided into separate signals proportional to the intensity of the light energy reflected from the painted surface and that reflected from adjacent surfaces, and a comparator and averager unit which compares the separate signals from the separator and transmits an output signal which is a function of the relationship of said signals to the recording device.

6. The electro-optical measuring instrument of claim 5 wherein said comparator and averager unit is provided with an ambient light gain control system, said gain control system including a light pickup device, and an automatic gain control unit connected between said light pickup device and said comparator and averager unit, said ambient light gain control system varying the gain of said comparator and averager unit in accordance with ambient light in the vicinity of said painted surface.

References Cited in the file of this patent

UNITED STATES PATENTS

| | | |
|---|---|---|
| 2,520,936 | Ingham | Sept. 5, 1950 |
| 2,812,447 | MacMartin | Nov. 5, 1957 |
| 2,850,645 | Chilton et al. | Sept. 2, 1958 |
| 2,880,309 | Gallagher et al. | Mar. 31, 1959 |
| 2,882,785 | Biesele | Apr. 21, 1959 |
| 2,931,566 | Strassner | Apr. 5, 1960 |